United States Patent
Iida et al.

[19]

[11] Patent Number: 5,950,606
[45] Date of Patent: Sep. 14, 1999

[54] SYSTEM FOR DIAGNOSING FUEL SUPPLY SYSTEM OF INTERNAL COMBUSTION ENGINE

[75] Inventors: Hisashi Iida; Shujiro Morinaga, both of Kariya; Hidenobu Muto, Obu, all of Japan

[73] Assignee: Denso Corporation, Kariya, Japan

[21] Appl. No.: 09/111,929

[22] Filed: Jul. 8, 1998

[30] Foreign Application Priority Data

Jul. 14, 1997 [JP] Japan ..................................... 9-188095
Mar. 13, 1998 [JP] Japan ................................... 10-062875

[51] Int. Cl.$^6$ .................................................. F02D 41/14
[52] U.S. Cl. .......................... 123/672; 123/674; 123/690; 123/479
[58] Field of Search ..................................... 123/672, 674, 123/690, 479; 73/116, 118.1

[56] References Cited

U.S. PATENT DOCUMENTS 5,048,490  9/1991  Nakaniwa ................................ 123/479
5,094,214  3/1992  Kotzan .................................... 123/479
5,634,454  6/1997  Fujita ...................................... 123/690
5,694,912 12/1997  Gotou et al. ............................ 123/674
5,752,492  5/1998  Kato et al. .............................. 123/674

FOREIGN PATENT DOCUMENTS

A-4-171237   6/1992  Japan .
A-5-163983   6/1993  Japan .
A-7-259619  10/1995  Japan .

*Primary Examiner*—Willis R. Wolfe
*Assistant Examiner*—Mahmoud M. Gimie
*Attorney, Agent, or Firm*—Nixon & Vanderhye P.C.

[57] ABSTRACT

In an engine fuel supply system, the difference between the actual and target air-fuel ratios, an air-fuel ratio feedback correction coefficient and a learned correction amount are added as a parameter for diagnosing the fuel supply system. The diagnostic parameter is smoothed and the smoothed value is compared with a diagnosis reference value, thereby detecting a malfunction in the fuel supply system. Even if the learned correction amount is not updated, the malfunction in the fuel supply system can be promptly detected from the difference between the actual and target air-fuel ratios and the air-fuel ratio correction coefficient. The diagnosis reference value is determined variably in accordance with engine operating parameters such as the amount of intake air.

24 Claims, 11 Drawing Sheets

SYSTEM FOR DIAGNOSING FUEL SUPPLY SYSTEM OF INTERNAL COMBUSTION ENGINE

CROSS REFERENCE TO RELATED APPLICATION

This application relates to and incorporates herein by reference Japanese patent applications No. 9-188095 filed on Jul. 14, 1998 and No. 10-62875 filed on Mar. 13, 1998.

BACKGROUND OF THE INVENTION

1. Field of the Invention

The present invention relates to a system for diagnosing the fuel supply system of an internal combustion engine.

2. Related Art

In a diagnosis system for a fuel supply system according to JP-A-4-171237, a learned correction coefficient for correcting deviation of an actual air-fuel ratio from a target air-fuel ratio is used for diagnosing the fuel supply system. The learned correction amounts are averaged for each operating zone in which basic fuel injection amounts are generally unchanged so much and the average value of the learned correction amounts is compared with the average value of the learned correction amounts of an operating zone having a different basic fuel injection amount, thereby diagnosing the fuel supply system.

In another diagnosing system for a fuel supply system according to U.S. Pat. No. 5,094,214, a learned correction amount and a feedback correction amount of an air-fuel ratio are used as diagnostic data and the fuel supply system is diagnosed by discriminating whether or not a state in which both the learned correction amount and the feedback correction amount reach the upper and lower limit values (guard values) of an air-fuel ratio control range continues for a predetermined time.

According to those diagnosing systems for the fuel supply system, the learned correction amount is used as diagnostic data. The learning or updating speed of the learned correction amount is, however, generally set to be slow in order to prevent erroneous learning. Consequently, the period until the learned correction amount is updated is relatively long. Even if a malfunction or abnormality occurs in the fuel supply system during this period, the malfunction of the fuel supply system cannot be detected until the learned correction amount is updated. When the air-fuel ratio is equal to or larger than the feedback correction amount, there is a case such that the updating of the learned correction amount is inhibited. In this case, malfunction of the fuel supply system cannot be detected until the learned correction amount becomes equal to or lower than the feedback correction amount. In short, those diagnosing systems have a drawback such that the diagnosing operation is influenced by the updating time of the learned correction amount and malfunction of the fuel supply system cannot be promptly detected.

SUMMARY OF THE INVENTION

It is therefore an object of the invention to provide a system for diagnosing a fuel supply system of an internal combustion engine, which can timely detect an occurrence of a malfunction in the fuel supply system even if a learned correction amount is not updated.

A diagnosing system for a fuel supply system of an internal combustion engine according to the invention is directed to an internal combustion engine in which a required fuel injection amount is set on the basis of a basic fuel injection amount which is set according to an engine operating state, a learned correction amount, and a feedback correction amount. The diagnosis is performed on the basis of the difference between an actual air-fuel ratio and a target air-fuel ratio, a learned correction amount, and a feedback correction amount as fuel supply system diagnosing data. Consequently, even if the learned correction amount is not updated, a malfunction (that is, an abnormal deviation of the actual air-fuel ratio) in the fuel supply system can be promptly detected from the difference between the actual air-fuel ratio and the target air-fuel ratio and the feedback correction amount, thereby improving the reliability of the diagnosis.

It is also possible that the diagnosis of each of the three diagnostic data is evaluated and, after that, the three respective evaluations are totally evaluated, thereby diagnosing the fuel supply system. Preferably, the fuel supply system may be also diagnosed by adding up the three diagnostic data and detecting a malfunction on the basis of the sum of those three data.

In this case, preferably, the sum of the three diagnostic data is smoothed and the fuel supply system is diagnosed on the basis of the smoothed value. In this manner, the stable diagnosis can be performed without being influenced by instantaneous fluctuation in air-fuel ratio detection value by noises or the like, sudden fluctuation in an engine operating state at the time of transient driving, and the like.

Further, preferably, a diagnosis reference value used for diagnosing the fuel supply system can be also set variably on the basis of the engine operating state to improve further the diagnosis accuracy.

When the concentration of the fuel evaporation gas introduced from a fuel evaporation gas purge system into an engine intake system is high, it is likely that a deviation of the actual air-fuel ratio becomes temporarily large and it may be erroneously diagnosed that there is a malfunction. Consequently, when the concentration of the fuel evaporation gas introduced to the intake system is equal to or higher than a predetermined value, it is preferable to inhibit the diagnosis. In this manner, the diagnosis can be performed under stable operating conditions in which influence by the concentration of the fuel evaporation gas is not so large, so that the reliability of the diagnosis can be improved.

BRIEF DESCRIPTION OF THE DRAWINGS

Other objects, features and advantages of the invention will be made more apparent by the following detailed description with reference to the accompanying drawings. In the drawings.

DETAILED DESCRIPTION OF THE PREFERRED EMBODIMENTS

Figure 1:
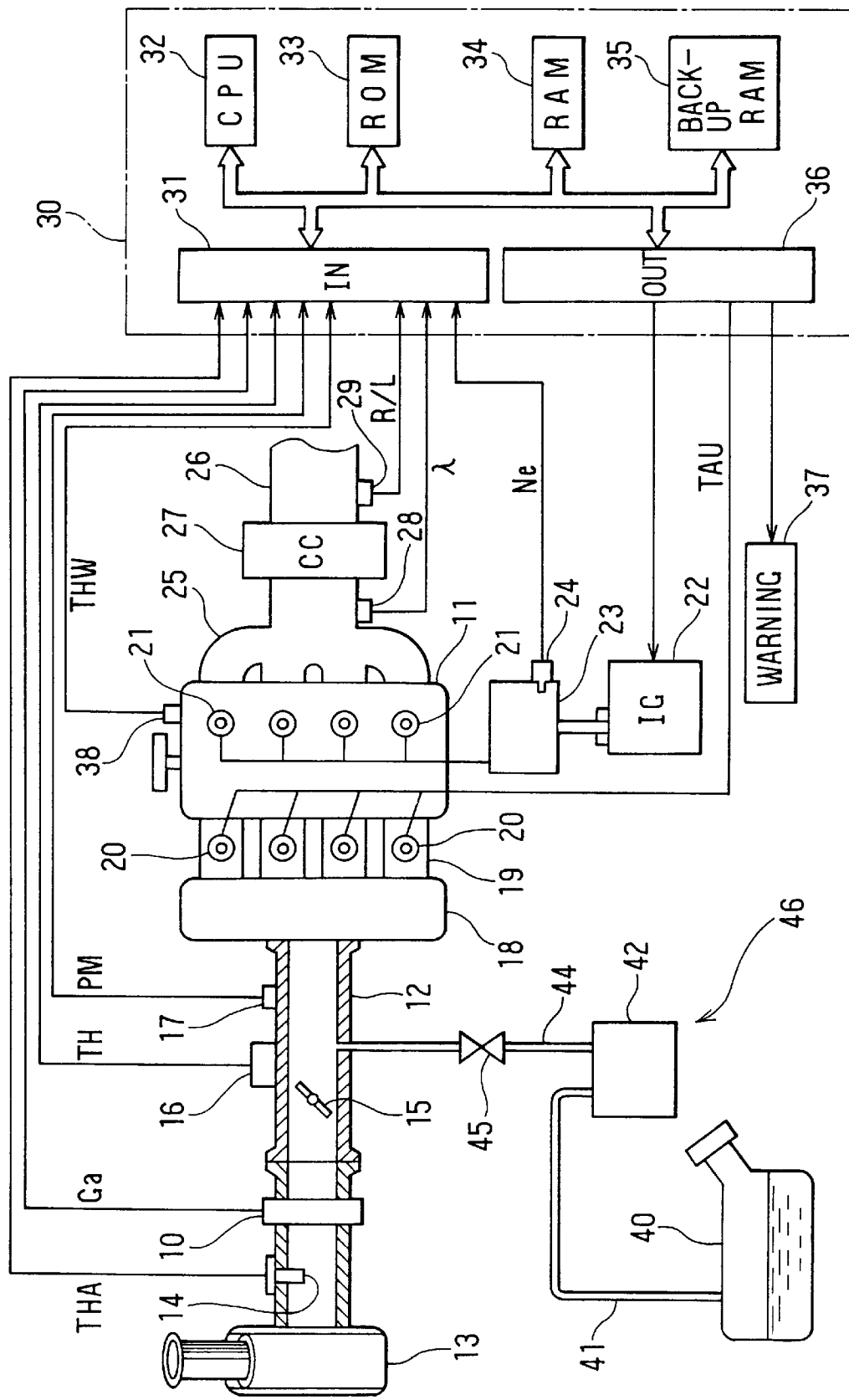
FIG. 1 is a schematic block diagram of an engine control system to which a diagnosing system according to an embodiment of the invention is applied.

Referring to FIG. 1 showing an engine control system, an air cleaner 13 is provided in the uppermost stream of an intake pipe 12 of an engine 11. An intake air temperature sensor 14 for sensing an intake air temperature THA and an air flow meter 10 for sensing an intake air amount Ga are provided on the downstream side of the air cleaner 13. On the downstream side of the air flow meter 10, a throttle valve 15 and a throttle opening angle sensor 16 for sensing a throttle opening angle TH are provided.

Further, on the downstream side of the throttle valve 15, an intake vacuum sensor 17 for sensing an intake vacuum pressure PM is provided and a surge tank 18 is provided on the downstream side of the intake vacuum sensor 17. Intake manifolds 19 for introducing air into the respective cylinders of the engine 11 are connected to the surge tank 18. Fuel injection valves 20 for injecting fuel are attached to the respective intake manifolds 19 of the cylinders. The fuel injection valves 20, a fuel tank 40, a fuel pump (not shown), and the like provide a fuel supply system. Fuel pumped by the fuel pump from the fuel tank 40 is distributed to each fuel injection valve 20 via a fuel pipe (not shown).

A fuel evaporation gas from the fuel tank 40 is adsorbed by an adsorbent (not shown) such as activated charcoal in a canister 42 via a communication pipe 41. A purge pipe 44 for purging (discharging) the fuel evaporation gas adsorbed in the canister 42 into the intake pipe 12 is provided between the canister 42 and the intake pipe 12 and a purge control valve 45 for regulating the evaporation gas purging is provided in the middle of the purge pipe 44. The canister 42, the purge control valve 45, the purge pipe 44, and the like provide a fuel purging system 46.

Spark plugs 21 are attached to the respective cylinders of the engine 11 and a high-voltage current generated by a spark ignition circuit (IG) 22 is supplied via a distributer 23 to each spark plug 21. A crank angle sensor 24 for generating, for example, 24 pulse signals every 720° CA (two rotations of a crankshaft) is provided for the distributer 23 and the engine rotational speed Ne is detected by measuring the intervals of the successive two of the output pulses of the crank angle sensor 24. A coolant temperature sensor 38 for sensing an engine coolant temperature THW is attached to the engine 11.

An exhaust pipe 26 is connected via exhaust manifolds 25 to exhaust ports (not shown) of the engine 11 and a three-way catalyst converter (CC) 27 including a catalytic rhodium for reducing harmful components (CO, HC, NOx, and the like) in an exhaust gas is provided in the middle of the exhaust pipe 26. On the upstream side of the catalyst 27, an air-fuel ratio sensor 28 for generating a linear air-fuel ratio signal indicative of the actual air-fuel ratio $\lambda$ of the exhaust gas is provided. On the downstream side of the catalyst 27, an oxygen sensor 29 whose output voltages R and L are changed in step according to the detection result whether the actual air-fuel ratio (R/L) of the exhaust gas is on the rich or lean side with respect to the stoichiometric is provided.

Outputs of the above sensors are read by an engine control electronic circuit 30 via an input port 31. The engine control circuit 30 is constructed mainly by a microcomputer and comprises a CPU 32, a ROM 33 (storage medium), a RAM 34, a backup RAM 35 backed up by a battery (not shown), and the like. By executing control programs for controlling the fuel injection shown in FIGS. 2, 4, and 7 and a spark ignition control program (not shown) which are stored in the ROM 33, a required fuel injection amount TAU, a spark timing Ig, and the like are computed by using engine operation parameters detected by the various sensors. Signals according to the calculation results are outputted from an output port 36 to the fuel injection valves 20 and the spark ignition circuit 22, thereby controlling the operation of the engine 11.

Figure 13:
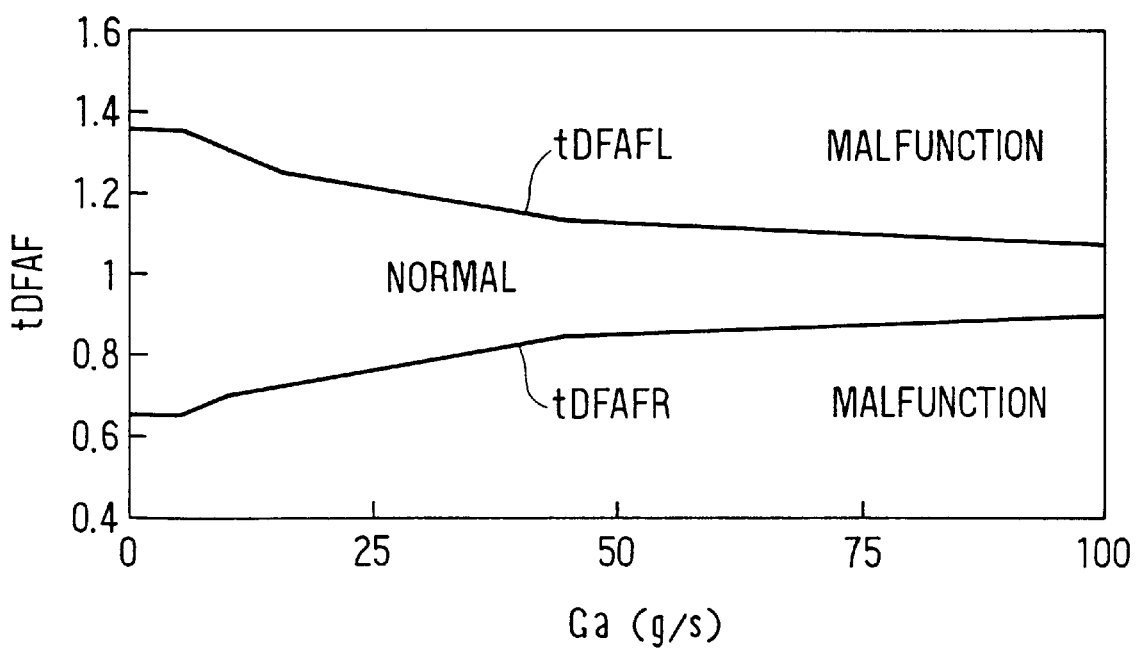
FIG. 13 is a data map showing the relation between an intake air amount and a diagnosis reference value.

Further, in the engine control circuit 30, programs for diagnosing the fuel supply system shown in FIGS. 8 to 12, a diagnostic reference map of FIG. 13 used for the programs, initial values, and the like are stored into the ROM 33. By executing the programs shown in FIGS. 8 to 12, the fuel supply system is diagnosed on the basis of (1) the difference between the actual air-fuel ratio and the target air-fuel ratio, (2) a learned correction amount, and (3) a feedback correction amount. When a malfunction in the fuel supply system is detected, a warning signal is outputted from the output port 36 to a warning lamp 37 to turn on the warning lamp 37 to thereby alert the driver to the malfunction.

The CPU 32 executes the control programs as follows.

[Air-fuel Ratio Control]

Figure 2:
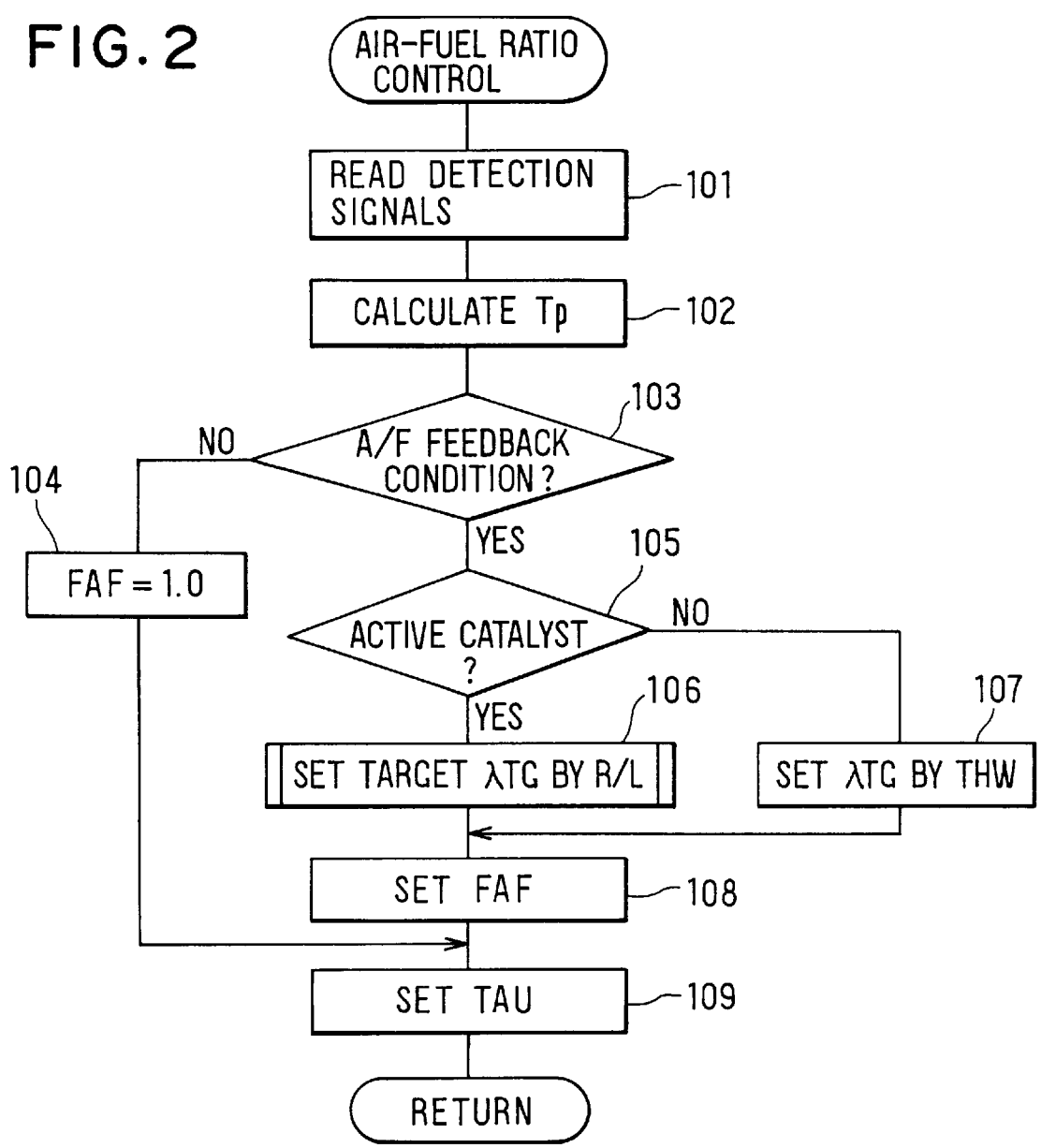
FIG. 2 is a flowchart showing a process of an air-fuel ratio control in the engine control system.

The CPU 32 executes an air-fuel ratio control program shown in FIG. 2 for setting a required fuel injection amount TAU through a feedback control of the air-fuel ratio and is started every predetermined crank angle rotation (for example, every 360° CA). When the program is activated, first in step 101, detection signals (for example, engine rotational speed Ne, intake vacuum pressure PM, coolant temperature THW, air-fuel ratio $\lambda$, oxygen concentration R/L in exhaust gas, and the like) from the various sensors are read. After that, in step 102, a basic fuel injection amount Tp is calculated from a map or the like in accordance with the engine operating state (engine rotational speed Ne, intake vacuum pressure PM, and the like).

In step 103, whether the air-fuel ratio (A/F) feedback conditions are satisfied or not is discriminated. When all of the following air-fuel feedback conditions (A1) to (A4) are satisfied, it is discriminated as "Yes". When even one of them is not satisfied, it is discriminated as "No".

(A1) various fuel increase corrections are not performed.
(A2) a fuel cut-off is not being performed.
(A3) a heavy load operation is being performed.
(A4) the air-fuel ratio sensor 28 is active.

The activation of the air-fuel ratio sensor 28 in (A4) can be determined by, for instance: (1) whether the coolant temperature THW is equal to or higher than a predetermined temperature (for example, 30° C.) or not; (2) whether an elapsed time since the engine starting is a predetermined time or longer; (3) whether the output is actually generated from the air-fuel ratio sensor 28 or not; or (4) detecting an element impedance (corresponding to element temperature) of the air-fuel ratio sensor 28.

When step 103 determines that the air-fuel ratio feedback conditions are not satisfied, the processing routine advances to step 104, an air-fuel ratio correction coefficient (feedback correction amount) FAF is set to "1.0" and the program proceeds to step 109. In this case, the air-fuel ratio is not corrected because of no feedback control in effect.

Figure 4:
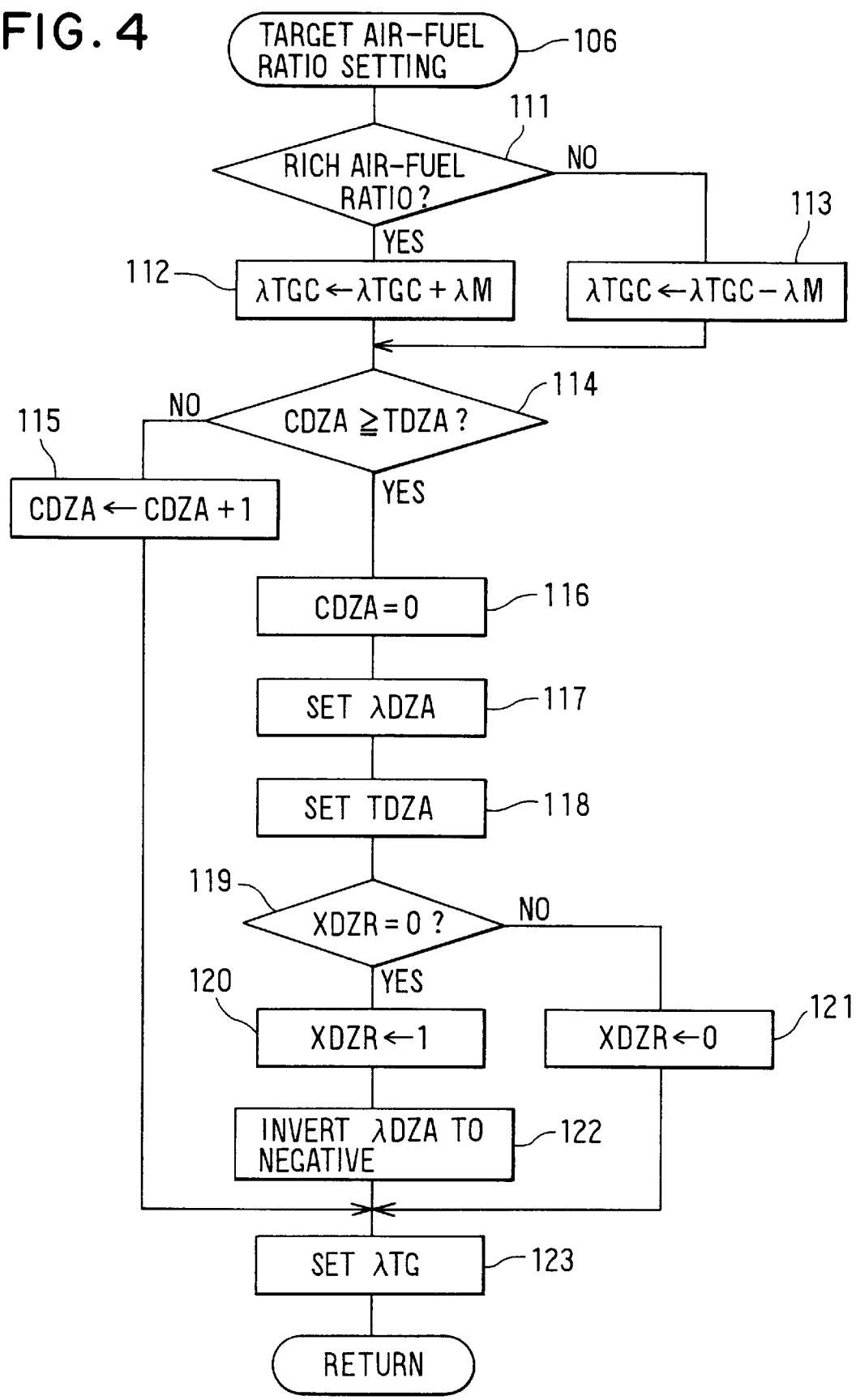
FIG. 4 is a flowchart showing a process of setting a target air-fuel ratio setting.

On the other hand, when step 103 determines that the air-fuel ratio feedback conditions are satisfied, the processing routine advances to step 105 and whether the catalyst 27 is active or not is determined. Whether the catalyst 27 is active or not is determined by, for instance, whether the coolant temperature THW is equal to or higher than a predetermined temperature (for example, 40° C.). When it is determined in step 105 that the catalyst 27 is active, the processing routine advances to step 106 where a target air-fuel ratio setting program of FIG. 4 is executed and the target air-fuel ratio $\lambda$TG is set on the basis of the output R/L of the oxygen sensor 29 on the downstream side of the catalyst 27. After that, the routine advances to step 108.

Figure 3:
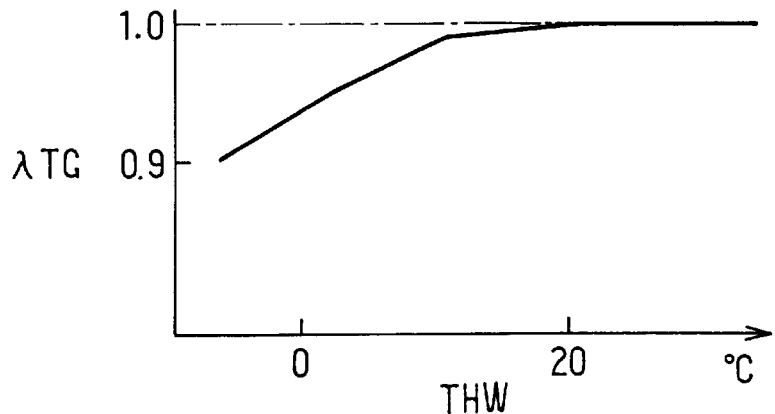
FIG. 3 is a data map showing the relation between a coolant temperature and a target air-fuel ratio.

On the contrary, when it is determined in step 105 that the catalyst 27 is not active, the processing routine advances to step 107, a target air-fuel ratio map having the coolant temperature THW as a parameter shown in FIG. 3 is retrieved, the target air-fuel ratio $\lambda$TG according to the coolant temperature THW at that time is set, and the processing routine advances to step 108.

After setting the target air-fuel ratio $\lambda$TG in step 106 or 107, the processing routine advances to step 108 where the air-fuel ratio correction coefficient FAF is calculated by the following equation on the basis of the target air-fuel ratio $\lambda$TG and the output $\lambda$ (actual air-fuel ratio) of the air-fuel ratio sensor 28.

$$FAF(k)=K1\cdot\lambda(k)+K2\cdot FAF(k-3)+K3\cdot FAF(k-2)+K4\cdot FAF(k-1)+ZI(k)$$

where, $ZI(k)=ZI(k-1)+Ka\cdot\{\lambda TG-\lambda(k)\}$ k is a variable showing the number of controls from the start of the first sampling, K1 to K4 are optimum feedback constants, and Ka is an integration constant.

In the following step 109, the arithmetic operation of the following equation is executed by using the basic fuel injection amount Tp, the air-fuel ratio correction coefficient FAF, and a learned correction amount KGj in the present engine operating zone among learned correction amounts KGj of the air-fuel ratio stored in the backup RAM 35, thereby obtaining the required fuel injection amount TAU, and the program is finished.

$$TAU=Tp\cdot FAF\cdot KGj\cdot FALL$$

where, FALL is another correction coefficient (for example, a correction coefficient by the engine temperature, a correction coefficient at the time of acceleration and deceleration, and the like) except for the air-fuel ratio correction coefficient FAF and the learned correction amount KGj.

[Target Air-fuel Ratio Setting]

The target air-fuel ratio setting program shown in FIG. 4 is a subroutine executed in step 106 shown in FIG. 2. In this program, the median $\lambda$TGC of the target air-fuel ratio is set so as to correct the deviation between the actual air-fuel ratio and the output $\lambda$ (actual or detected air-fuel ratio) of the air-fuel ratio sensor 28 on the basis of the output R/L of the oxygen sensor 29 in steps 111 to 113. Specifically, whether the output R/L of the oxygen sensor 29 is rich is discriminated in step 111. In case of rich (R), the processing routine advances to step 112 and the median $\lambda$TGC is set larger by only a predetermined value $\lambda$M, that is, on the lean side by only $\lambda$M ($\lambda$TGC $\leftarrow \lambda$TGC+$\lambda$M).

Figure 5:
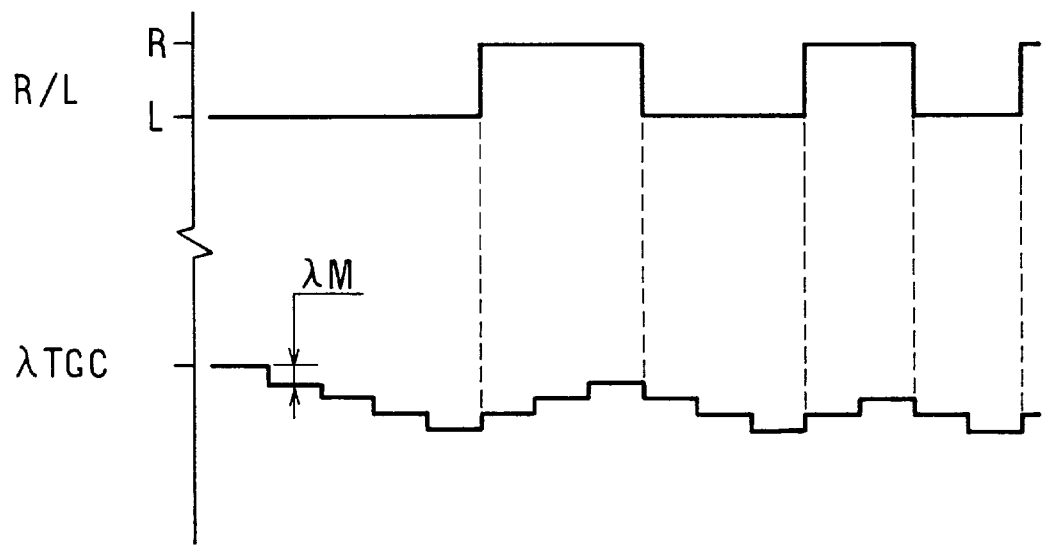
FIG. 5 is a timing chart showing the relation between an output of an oxygen sensor and the median $\lambda TGC$ of the target air-fuel ratios.

On the other hand, when the output R/L of the oxygen sensor 29 is lean (L), the processing routine advances to step 113 and the median $\lambda$TGC is set smaller by a predetermined value $\lambda$M, that is, on the rich side by $\lambda$M ($\lambda$TGC$\leftarrow \lambda$TGC-$\lambda$M). FIG. 5 shows an example when the median $\lambda$TGC of the target air-fuel ratio is set on the basis of the output R/L of the oxygen sensor 29.

After thus setting the median $\lambda$TGC of the target air-fuel ratio, the target air-fuel ratio $\lambda$TG is set by a dither control in steps 114 to 123 as follows. In step 114, whether a count value CDZA of a dither period counter is equal to or larger than a reference dither period TDZA or not is discriminated. The dither period TDZA is a factor for determining the resolution of the dither control. A preferable value corresponding to the operating state of the engine 11 is set each time by the process of step 118.

If the count value CDZA of the dither period counter is smaller than the dither period TDZA, the processing routine advances to step 115 where the count value CDZA of the dither period counter is increased by "1" and the process of step 123 is executed. In this case, the value of the target air-fuel ratio $\lambda$TG is not updated but the target air-fuel ratio $\lambda$TG which is set at the time is maintained.

On the other hand, when the count value CDZA of the dither period counter is equal to or larger than the dither period TDZA, the processing routine advances to step 116 where the count value CDZA of the dither period counter is reset to "0" and the following process is executed so that the target air-fuel ratio $\lambda$TG is changed stepwise alternately on the rich and lean sides around the median $\lambda$TGC as a center.

First in steps 117 and 118, a dither amplitude $\lambda$DZA and the dither period TDZA are set. The dither amplitude $\lambda$DZA is a factor for determining the control amount of the dither control. A preferable value corresponding to the operation state of the engine 11 is set each time in a manner similar to the dither period TDZA. As for the dither amplitude $\lambda$DZA and the dither period TDZA, a two-dimensional map (not shown) using the engine rotational speed Ne and the intake vacuum pressure PM as parameters is retrieved and the dither amplitude $\lambda$DZA and the dither period TDZA corresponding to the engine rotational speed Ne and the intake vacuum pressure PM at that time are obtained.

After that, whether a dither process flag XDZR is "0" or not is discriminated in step 119. When the target air-fuel ratio $\lambda$TG is set to the rich side with resect to the median $\lambda$TGC of the target air-fuel ratio, the dither process flag XDZR is set to "1" and when it is set to the lean side, XDZR is reset to "0".

When XDZR=0 is discriminated in step 119, that is, when the target air-fuel ratio $\lambda$TG is set to the lean side with respect to the median $\lambda$TGC of the target air-fuel ratios by the previous dither control, the processing routine advances to step 120 and the dither process flag XDZR is set to "1" so that the target air fuel ratio $\lambda$TG is set to the rich side by the dither control at this time. On the contrary, when XDZR=1 is discriminated in step 119, that is, the target air-fuel ratio $\lambda$TG has been set to the rich side with respect to the median $\lambda$TGC of the target air-fuel ratios by the previous dither control, the processing routine advances to step 121 and the dither process flag XDZR is reset to "0" so that the target air-fuel ratio $\lambda$TG is set to the lean side by the dither control at this time.

When the dither process flag XDZR is inverted in step 120 or 121 and XDZR is "1", the dither amplitude $\lambda$DZA is inverted to a negative value in step 122 (when XDZR=0, the dither amplitude λDZA set in step 112 or 113 is used as it is). After that, the target air-fuel ratio λTG is set from the target air-fuel ratio median λTGC and the dither amplitude λDZA in step 123. For example, when the target air-fuel ratio λTG has been set to the lean side with respect to the target air-fuel ratio median λTGC by the previous dither control, the target air-fuel ratio λTG is calculated in the present dither control by the following equation so that the target air-fuel ratio λTG is set to the rich side with respect to the median λTGC by only the dither amplitude λDZA.

$$\lambda TG = \lambda TGC - \lambda DZA$$

On the contrary, when the target air-fuel ratio λTG has been set to the rich side with respect to the target air-fuel ratio median λTGC by the previous dither control, the target air-fuel ratio λTG is calculated by the following equation in the dither control at this time so that the target air-fuel ratio λTG is set to the lean side with respect to the median λTGC by only the dither amplitude λDZA.

$$\lambda TG = \lambda TGC + \lambda DZA$$

Figure 6:
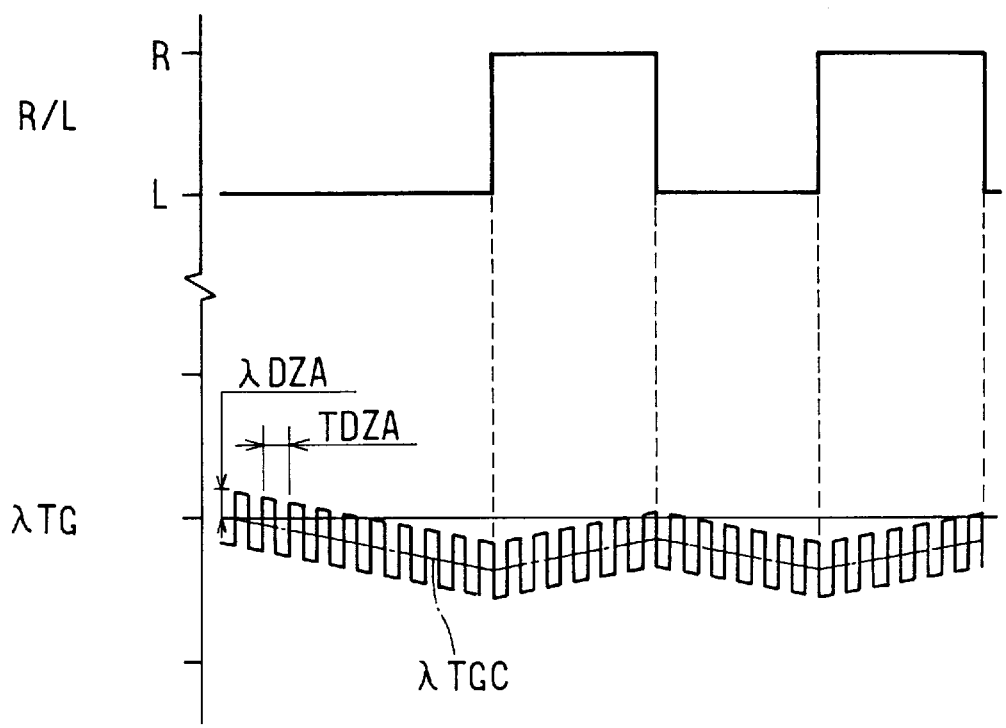
FIG. 6 is a timing chart showing the relation between the output of the oxygen sensor and the target air-fuel ratio $\lambda TG$.

By such a dither control, as shown in FIG. 6, the target air-fuel ratio λTG is set so as to be changed stepwise alternately on the rich and lean sides with respect to the median λTGC as a center.

[Air-fuel Ratio Leaning]

Figure 7:
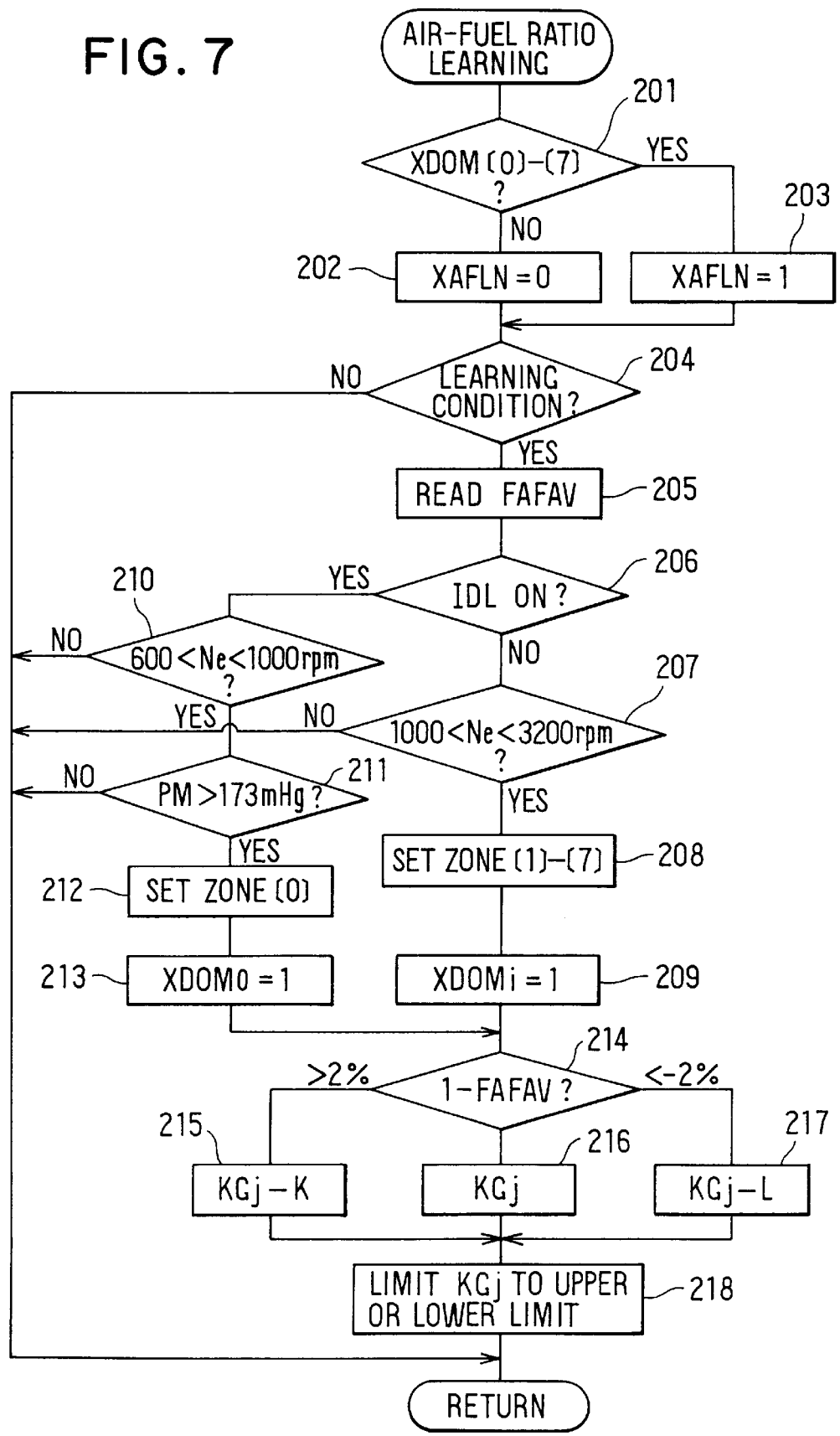
FIG. 7 is a flowchart showing a process of an air-fuel ratio learning.

The air-fuel ratio learning program shown in FIG. 7 is started every predetermined crank angle rotation. When the program is started, first in step 201, for example, whether all of the air-fuel ratios in eight operating zones 0 to 7 have been learned or not is discriminated. This discrimination is performed depending on whether "1" which denotes that the learning is finished is set or not in the learn flags XDOM0 to XDOM7 corresponding to the operating zones [0] to [7]. When all of the air-fuel ratios of the eight operating zones [0] to [7] have been learned (when each of XDOM0 to XDOM7=1), the processing routine advances to step 203 and a learning end flag XAFLN is set to "1" which denotes the end of learning of the whole zones.

On the other hand, when the air-fuel ratio of even one of the operating zones has not been learned, the processing routine advances from step 201 to step 202 where the learning end flag XAFLN is reset to "0".

After that, in step 204, it is checked whether the following learning conditions (B1) to (B6) are satisfied or not.

(B1) the air-fuel ratio feedback control is being executed.

(B2) the coolant temperature THW is equal to or higher than, for example, 80° C.

(B3) increase after the start is "0".

(B4) warm-up increase is "0".

(B5) time has elapsed from the beginning of the present operating zone by only a predetermined crank angle.

(B6) a battery voltage is, for example, equal to or higher than 11.5V.

If even one of the conditions (B1) to (B6) is not satisfied, the learning conditions are unsatisfied and the program is finished without performing the learning process from step 205.

On the other hand, when all of the conditions (B1) to (B6) are satisfied, the learning conditions are satisfied and the learning process from step 205 is executed as follows. First in step 205, an average value FAFAV of air-fuel ratio compensation coefficients FAF stored in the RAM 34 is read out. After that, whether the vehicle is idling (IDL ON) or not is discriminated in step 206 and the learning process is executed as follows in accordance with the idling state or the running state.

That is, if the vehicle is running, the processing routine advances to the step 207 and a check is made to see whether or not the engine rotational speed Ne at that time lies within a range from 1000 to 3200 rpm (stable running state). If it is out of the range, the program is finished without performing the subsequent process. On the other hand, when the engine rotational speed Ne lies within the range from 1000 to 3200 rpm, it is determined that the learning process can be executed. The processing routine advances to step 208 where a check is made to see which operating zones [1] to [7] does the engine 11 correspond. It is checked on the basis of a load (for example, intake vacuum pressure PM) of the engine 11. One of the operating zones [1] to [7] is set as the learning process zone in accordance with the magnitude of the load. After that, in step 209, a learn flag XDOMi corresponding to a zone (i) (i is either one of [1] to [7]) determined in step 208 is set.

On the other hand, when it is discriminated that the vehicle is idling, (1) whether or not the engine rotational speed Ne lies within a range, for example, from 600 to 1000 rpm (stable idle state) in step 210 and (2) whether the intake vacuum pressure PM is higher than, for instance, 173 mmHg or not is discriminated in step 211. If even only one of the two conditions (1) and (2) is not satisfied, the program is finished without executing the subsequent process.

On the other hand, when both of the two conditions (1) and (2) are satisfied, it is determined that the learning process can be performed. The processing routine advances to step 212 and the operating zone is set to the zone [0]. After that, in step 213, the learn flag XDOM0 corresponding to the zone [0] set in step 212 is set.

After setting the learn flag XDOMi or XDOM0 in accordance with the present operating state, the learned correction amount KGj (j=0 to 7) of the air-fuel ratio is set or the learned correction amount KGj which has been already set is updated in steps 214 to 217. The learning process is executed as follows. First in step 214, a deviation amount (1−FAFAV) of the average value FAFAV of the air-fuel ratio correction coefficients read in step 205 from a reference value (1.0) is calculated. When the deviation amount is equal to or more than a predetermined value (for example, 2%), the learned correction amount KGj of the zone is corrected by only a predetermined value K% in step 215. When the deviation amount is equal to or less than a predetermined value (for instance, −2%), the learned correction amount KGj of the zone is corrected by only a predetermined value L% in step 217. If the deviation amount is within the range of the predetermined values, the learned correction amount KGj of the zone is maintained in step 216.

After that, in step 218, the upper and lower limits of the learned correction amount KGj which has been set (updated) in steps 215 to 217 are checked (guard process). In this process, the upper limit value of the learned correction amount KGj is set to, for instance, "1.2" and the lower limit value is set to, for example, "0.8". The upper and lower limit values can be also set every operating zone of the engine 11. The learned correction amount KGj set thus is stored every operating zone into the backup RAM 35.

[Fuel Evaporation Gas Concentration Detection]

Figure 8:
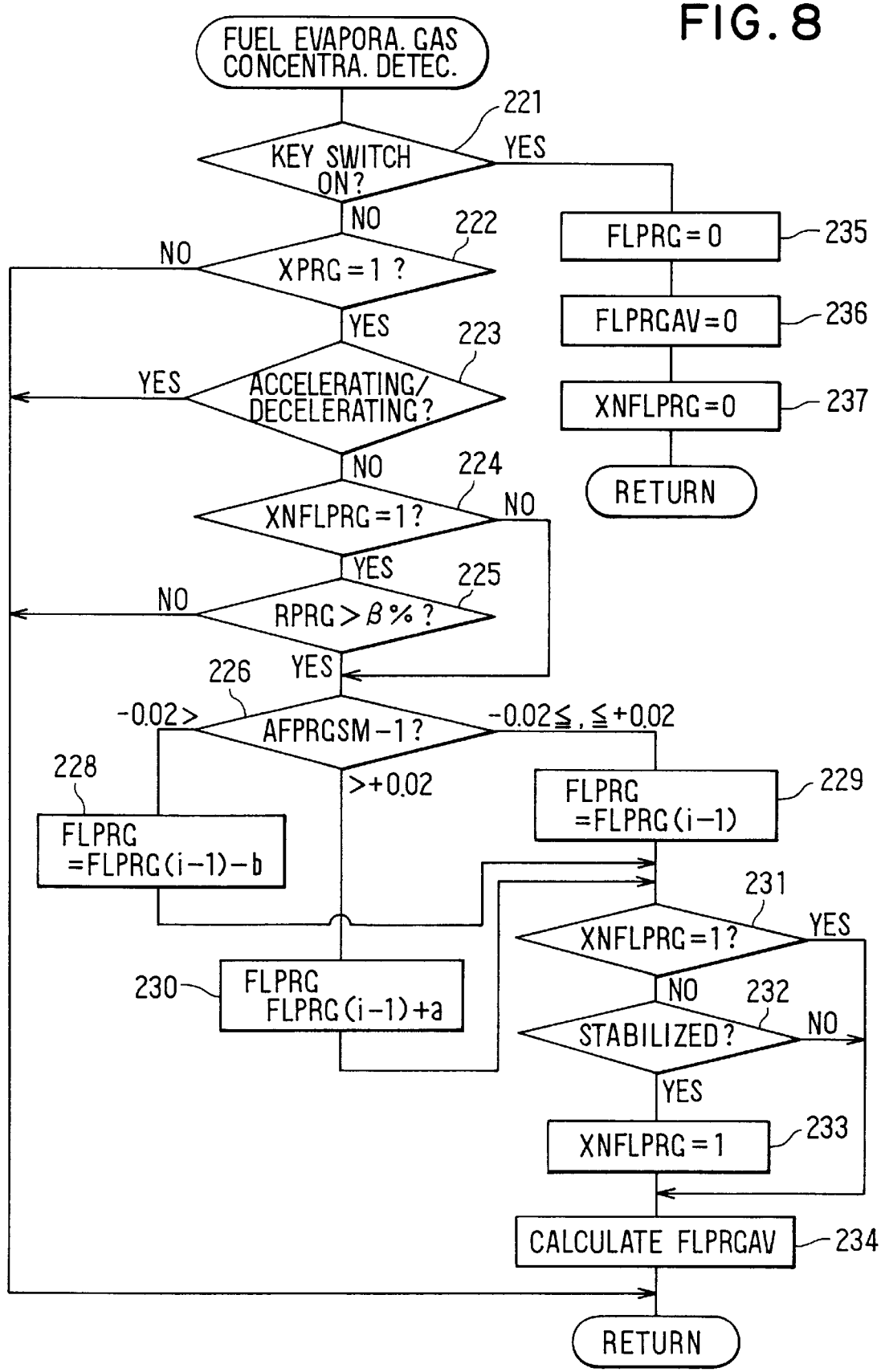
FIG. 8 is a flowchart showing a process of a fuel evaporation gas concentration detection.
Figure 9:
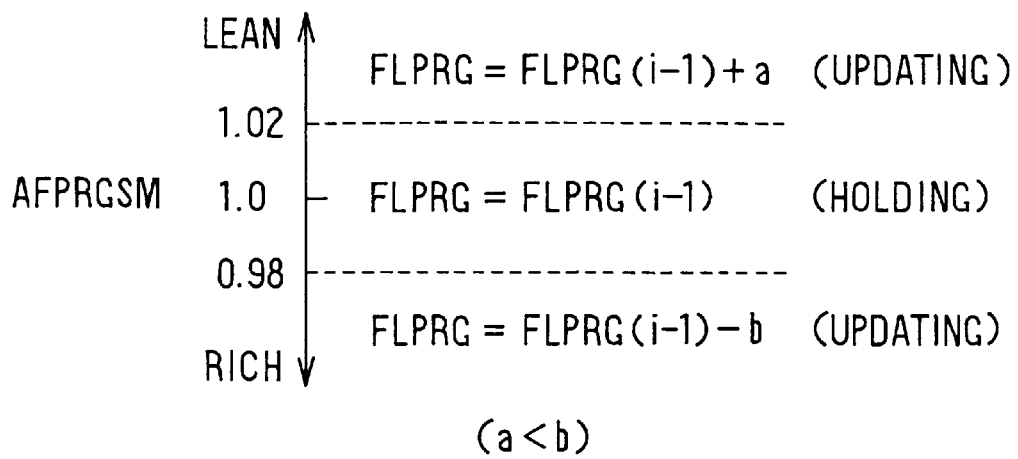
FIG. 9 is a diagram showing a method of updating a learned value of a fuel evaporation gas concentration FLPRG.

The concentration of the fuel evaporation gas is detected by an interruption process of every, for example, 4msec in accordance with a fuel evaporation gas concentration detecting program shown in FIG. 8. When this program is started, in step 221, whether a key switch is turned on or not is discriminated. If "Yes", each data is initialized in steps 235 to 237 as follows; fuel evaporation gas concentration FLPRG=0, fuel evaporation gas concentration average value FLPRGAV=0, and initial concentration detection end flag XNFLPRG=0.

When the fuel evaporation gas concentration FLPRG=0 and the fuel evaporation gas concentration average value FLPRGAV=0, it denotes that the concentration of the fuel evaporation gas is "0" (i.e., the fuel evaporation gas is not adsorbed in the canister 32 at all). The adsorption amount is assumed to be "0" by the initialization at the time of engine start. The initial concentration detection end flag XNFLPRG=0 denotes that the fuel evaporation gas concentration has not been detected yet after the start of the engine.

After turning on the key switch, the processing routine advances to step 222 and whether a purge execution flag XPRG is "1" or not, that is, whether a purge control has been started or not is checked. When XPRG=0 (before the purge control start), the program is finished. On the other hand, when XPRG=1 (the purge control has been started), the processing routine advances to step 223 to discriminate whether the vehicle is accelerating or decelerating. It is discriminated by detection results of the "off" state of an idle switch (not shown), change in opening angle of the throttle valve 13, change in the intake vacuum pressure, change in vehicle speed, and the like. When it is determined that the vehicle is accelerating or decelerating, the program is finished. That is, the detection of the concentration of the fuel evaporation gas is inhibited during the acceleration or deceleration (in a transient state of the engine operation), thereby preventing an erroneous detection.

When it is discriminated that the vehicle is not accelerating or decelerating in step 223, the processing routine advances to step 224 and whether an initial concentration detection end flag XNFPG is "1" or not, that is, the initial detection of the concentration of the fuel evaporation gas has been finished or not is discriminated.

When XNFLPRG=1 (after the initial detection), the processing routine advances to step 225. When XNFLPRG=0 (before the initial detection), the processing routine skips step 225 and advances to step 226.

Since the fuel evaporation gas concentration detection has not been finished yet in the beginning (XNFLPRG =0), the processing routine advances from step 224 to step 226 and how much a smoothed value AFPRGSM of a purge control amount AFPRG is deviated from a reference value (=1) is discriminated. When AFPRGSM-1<-0.02, the processing routine advances to step 228 and a value obtained by subtracting a predetermined value (b) from the previous fuel evaporation gas concentration FLPRG(i-1) is set to the fuel evaporation gas concentration FLPRG at this time. When $-0.02 \leq$ AFPRGSM-1 $\leq +0.02$, the processing routine advances to step 229 and the previous fuel evaporation gas concentration FLPRG(i-1) is used as it is as the fuel evaporation gas concentration FLPRG of this time. When AFPRGSM-1>+0.02, the processing routine advances to step 230 and a value obtained by adding the predetermined value (a) to the previous fuel evaporation gas concentration FLPRG(i-1) is set to the present fuel evaporation gas concentration FLPRG. In this case, the predetermined value (a) is set to be smaller than the predetermined value (b) since when the fuel evaporation gas concentration is low, even if the purging operation is executed, the concentration decreases only gradually.

The initial value of the fuel evaporation gas concentration FLPRG is set to "0" by the above initializing step 235 and a learned value of the fuel evaporation gas concentration FLPRG is smoothed in accordance with the deviation of the smoothed value AFPRGSM of the purge control amount by the process of steps 226 to 230. The process of steps 226 to 230. A method of updating the learned value of the fuel evaporation gas concentration FLPRG will be further easily understood with reference to FIG. 9.

After updating the learned value of the fuel evaporation gas concentration FLPRG, the processing routine advances to step 231 and whether the initial concentration detection end flag XNFLPRG is "1" indicative of the end of the initial concentration detection or not is discriminated. When XNFLPRG=0 (before the initial concentration detection), the processing routine advances to step 232 and whether the fuel evaporation gas concentration FLPRG has been stabilized or not is discriminated by checking whether or not a state where a change between the previous and present detection values of the fuel evaporation gas concentration FLPRG is equal to or lower than a predetermined value (for example, 3%) has been continued, for example, three times or more. When the fuel evaporation gas concentration FLPRG has been stabilized, the processing routine advances to the next step 233 and "1" is set to the initial concentration detection end flag XNFLPRG. After that, the processing routine advances to step 234.

On the other hand, when XNFLPRG=1 (the initial concentration detection has been finished) in step 231 or when it is discriminated in step 232 that the fuel evaporation gas concentration FLPRG is not stable, the processing routine jumps to step 234. In order to calculate the average of the fuel evaporation gas concentration FLPRG of this time, a predetermined smoothing operation (for example, $\frac{1}{64}$ smoothing operation) is executed and the fuel evaporation gas concentration average value FLPRGAV is obtained. The fuel evaporation gas concentration average value FLPRGAV is used to calculate a purge correction coefficient for the basic fuel injection amount.

When the initial concentration detection is finished (when XNFLPRG=1 is set), step 224 is always discriminated as "Yes", the processing routine advances to step 225, and a check is made to see whether a final purge ratio RPRG exceeds a predetermined value β (for example, 0%) or not. Only in the case of RPRG>β, the process for learning the fuel evaporation gas concentration of step 226 and subsequent steps is executed. That is, even when the purge execution flag XPRG is set to "1", there is a case that the final purge rate RPRG is "0". Since the purging operation is not actually executed in such a case, the fuel evaporation gas concentration is not detected when RPRG=0 except for the initial detection.

When the final purge ratio RPRG is small, that is, when the purge control valve 35 is controlled at a low flow rate, the accuracy of the opening angle control is relatively low and the reliability of the fuel evaporation gas concentration detection is low. Consequently, the value β in step 225 is set to a small opening angle of the purge control valve 45 (for example, 0%<β<2%) and the fuel evaporation gas concentration can be detected only when detection conditions for high accuracy are satisfied except for the initial detection.

[Diagnosis Execution Condition Determination]

Figure 10:
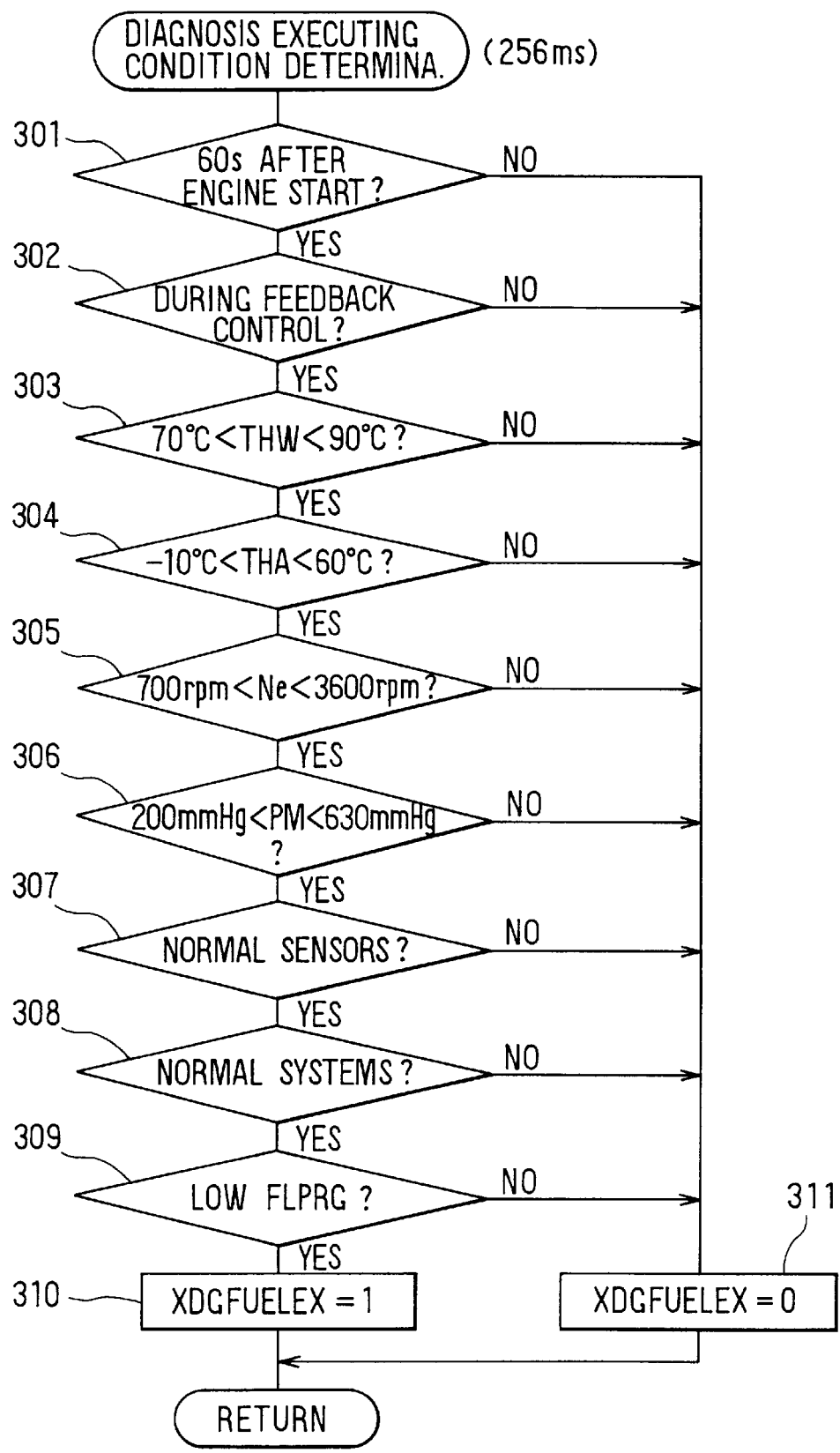
FIG. 10 is a flowchart showing a process of a diagnosis executing condition determination.

The diagnosis execution condition determining program shown in FIG. 10 is started every predetermined time (for example, every 256 msec) and whether the execution conditions for diagnosing the fuel supply system are satisfied or not is discriminated as follows. First in step 301, in order to check whether the operating state after the engine start has been stabilized or not, whether an elapsed time since the engine start exceeds, for example 60 seconds or not is discriminated. When the elapsed time has not reach 60 seconds, it is determined that the operating state is still unstable. The processing routine advances to step 311, a diagnosis permission flag XDGFUELEX is reset to "0" indicative of inhibition of the diagnosing operating and the program is finished.

On the other hand, when the elapsed time since the engine start exceeds 60 seconds, it is discriminated that the operating state after the engine start is stable. The processing routine advances from step 301 to step 302 and it is discriminated whether an air-fuel ratio feedback control is being executed or not (when the air-fuel ratio feedback conditions are satisfied in step 103 in FIG. 2). When the air-fuel ratio feedback control is not being executed, the processing routine advances to step 311 and the diagnosis permission flag XDGFUELEX is reset to "0".

When the air-fuel ratio feedback control is being executed, the processing routine advances from step 302 to step 303. Whether the coolant temperature THW is, for example, 70° C. <THW<90° C. or not is checked. If THW≦70° C. (before completion of the engine warm-up) or THW≧90° C. (in a high temperature zone where influence by the temperature characteristics of sensors and actuators becomes large), the processing routine advances to step 311, the diagnosis permission flag XDGFUELEX is reset to "0".

When 70° C.<THW<90° C., the processing routine advances from step 303 to step 304. It is discriminated whether the intake temperature THA is, for example, -10° C.<THA<60° C. or not. When THA<-10° C. (at an extremely low temperature) or THA>60° C. (in a high temperature zone where influence by the temperature characteristics of sensors and actuators becomes large), the processing routine advances to step 311, the diagnosis permission flag XDGFUELEX is reset to "0".

When -10° C.<THA<60° C., the processing routine advances from step 304 to step 305. Whether the engine rotational speed Ne is, for example, 700 rpm<Ne<3600 rpm or not is checked. When Ne≧700 rpm or Ne≦3600 rpm, the operating state of the engine 11 is unstable and it is likely that the fuel supply system will be erroneously diagnosed. Consequently, the processing routine advances to step 311, the diagnosis permission flag XDGFUELEX is reset to "0".

When 700 rpm<Ne<3600 rpm, the processing routine advances from step 305 to step 306. It is discriminated whether the intake vacuum pressure PM is, for example, 200 mmHg<PM<630 mmHg or not. When PM≦200 mmHg or PM ≧630 mmHg, the operating state of the engine 11 is unstable and it is likely that the fuel supply system is erroneously diagnosed. Consequently, the processing routine advances to step 311, the diagnosis permission flag XDGFUELEX is reset to "0".

When 200 mmHg<PM<630 mmHg, the processing routine advances from step 306 to step 307 and whether all of the sensors exerting influence on the air-fuel ratio such as the intake vacuum sensor 17, the coolant temperature sensor 38, the intake temperature sensor 14, the air-fuel ratio sensor 28, and the like are normal or not is checked. If even one of the sensors is not normal, it is likely that the fuel supply system will be erroneously diagnosed. Consequently, the processing routine advances to step 311, the diagnosis permission flag XDGFUELEX is reset to "0".

When all of the sensors that will exert influence on the air-fuel ratio are normal, the processing routine advances from step 307 to step 308. Whether all of systems exerting influence on the air-fuel ratio such as misfire detecting system, fuel evaporation gas purging system, and the like are normal or not is discriminated. When even one of the systems is not normal, it is likely that the fuel supply system is erroneously diagnosed. The processing routine therefore advances to step 311, the diagnosis permission flag XDGFUELEX is reset to "0".

When all of the misfire detecting system, the fuel evaporation gas purging system, and the like are normal, the processing routine advances from step 308 to step 309 and it is determined whether the fuel evaporation gas concentration FLPRG calculated by the fuel evaporation gas concentration detecting program of FIG. 8 is equal to or lower than a predetermined value (for example, 10%). In the case where the fuel evaporation gas concentration FLPRG is higher than the predetermined value, a deviation of the actual air-fuel ratio caused by the fuel evaporation gas becomes temporarily large and it is likely that the fuel supply system will be erroneously diagnosed to be malfunctioning. Consequently, the processing routine advances to step 311, the diagnosis permission flag XDGFUELEX is reset to "0".

When all of the conditions discriminated in steps 301 to 309 are satisfied, the diagnosis execution conditions are satisfied. The processing routine advances to step 310, the diagnosis permission flag XDGFUELEX is set to "1" indicative of permission of the diagnosing operation, and the program is finished.

[Diagnosis Parameter Calculation]

Figure 11:
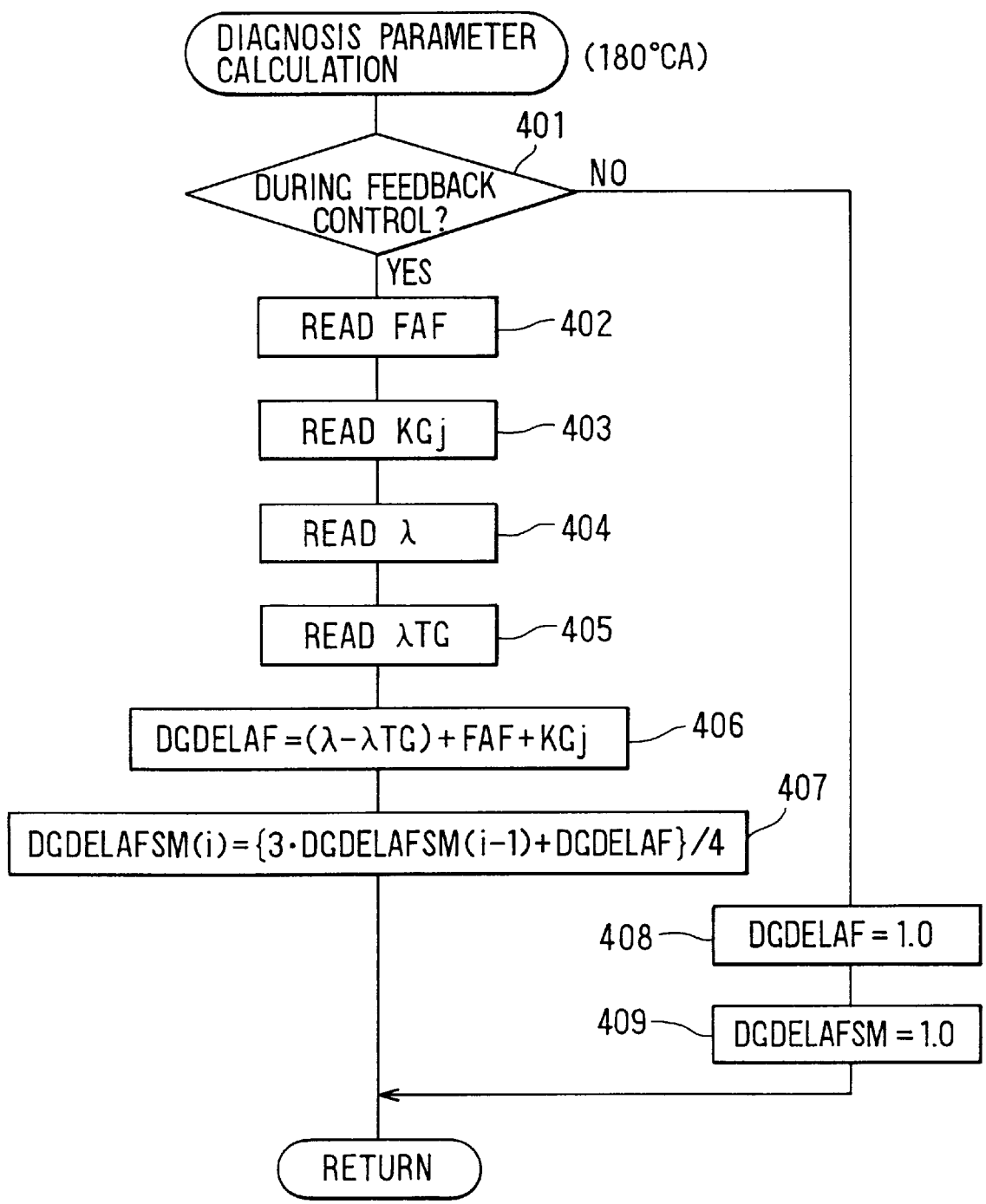
FIG. 11 is a flowchart showing a process of a diagnosis parameter calculation.

The diagnostic parameter calculating program shown in FIG. 11 is started every predetermined crank angle rotation (for example, every 180° CA rotation). When the program is started, first in step 401, whether the air-fuel ratio feedback control is being executed or not (when the air-fuel ratio feedback conditions are satisfied in step 103 in FIG. 2) is discriminated. When the air-fuel ratio feedback control is not being executed, the processing routine advances to steps 408 and 409, both of a diagnostic parameter DGDELAF and a diagnostic parameter smoothed value DGDELAFSM are set to "1.0" indicative of no malfunction and the program is finished.

On the other hand, when the air-fuel ratio feedback control is being performed, the air-fuel ratio correction coefficient FAF, the learned correction amount KGj, the actual air-fuel ratio λ, and the target air-fuel ratio λTG are read in steps 402 to 405. After that, in step 406, (1) the difference between the air-fuel ratio λ detected by the air-fuel ratio sensor 28 and the target air-fuel ratio λTG, (2) the air-fuel ratio correction coefficient FAF (feedback correction amount), and (3) the learned correction amount KGj are added up, thereby obtaining the diagnostic parameter DGDELAF.

$$DGDELAF = (\lambda - \lambda TG) + FAF + KGj$$

After that, in step 407, the diagnostic parameter DGDELAF is smoothed by the following equation, thereby obtaining a diagnostic parameter smoothed value DGDELAFSM.

$$DGDELAFSM(i) = \{3 \cdot DGDELAFSM(i-1) + DGDELAF\}/4$$

Although the smoothing coefficient is ¼ in the above equation, ⅓, ⅙, ⅛, and the like can be also used.

[Diagnosis Execution]

Figure 12:
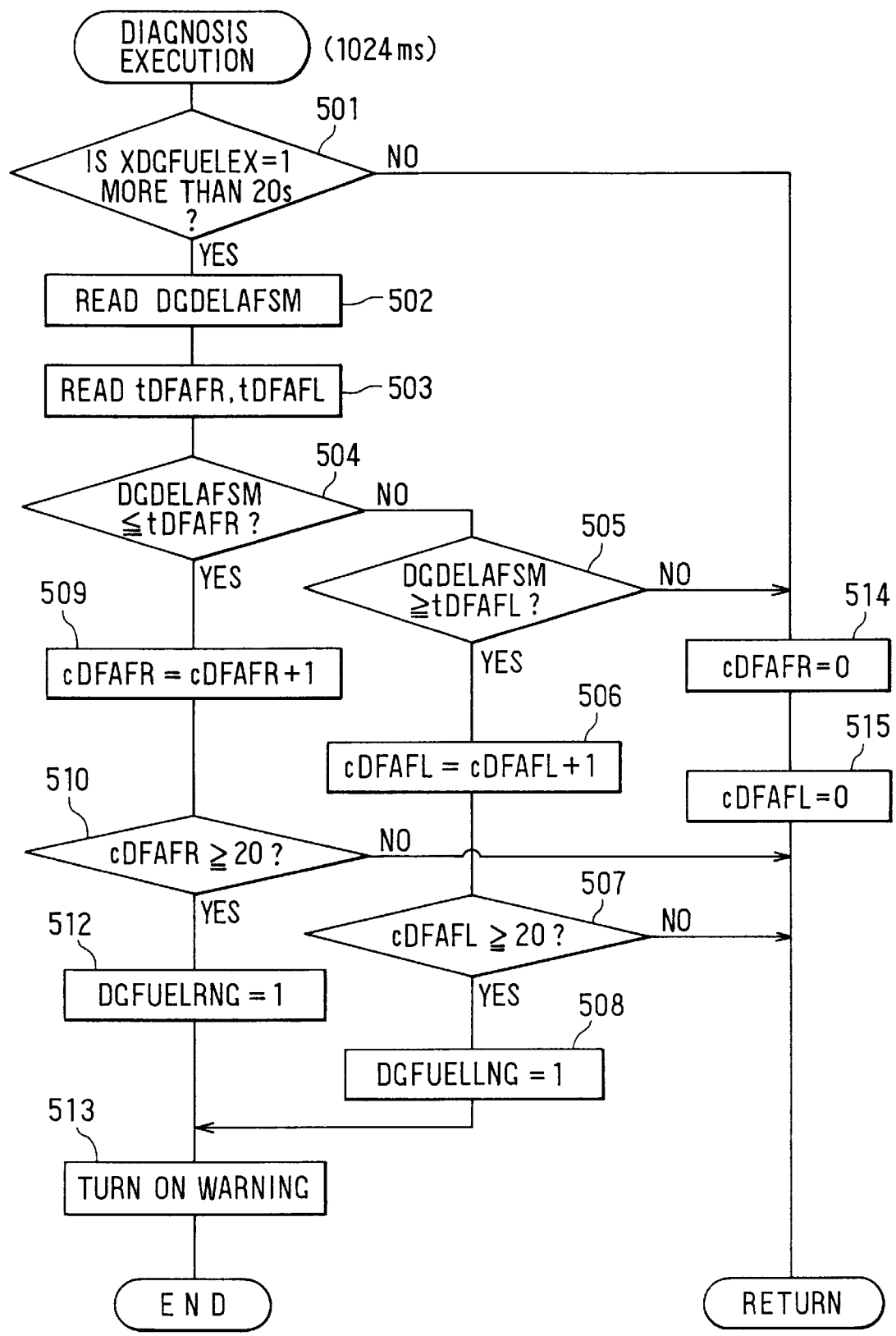
FIG. 12 is a flowchart showing a process of a diagnosis execution.

The diagnosis execution program shown in FIG. 12 is started every predetermined time (for example, every 1024 msec). When the program is started, first in step 501, whether the state of the diagnosis permission flag XDGFUELEX=1 (diagnosis permitted) has been continued for, for example, 20 seconds or not is checked. If "No", the processing routine advances to steps 514 and 515 and both of a rich side diagnosis counter cDFAFR and a lean side diagnosis counter cDFAFL are reset to "0".

After that, when the state of the diagnosis permission flag XDGFUELEX=1 has continued for 20 seconds, the processing routine advances from 501 to 502 and the diagnosis parameter smoothed value DGDELAFSM calculated in step 407 in FIG. 11 is read out. Subsequently, in step 503, a rich side diagnosis reference value tDFAFR and a lean side diagnosis reference value tDFAFL are read out from a diagnosis reference value map of FIG. 13 in accordance with the present intake air flow amount Ga.

After that, in step 504, the diagnostic parameter smoothed value DGDELAFSM is compared with the rich side diagnosis reference value tDFAFR. When DGDELAFSM≦tDFAFR (malfunction on the rich side), the processing routine advances to step 509 and the rich side diagnosis counter cDFAFR is increased by "1". In the following step 510, whether or not the count value of the rich side diagnosis counter cDFAFR becomes, for example, 20 or larger, that is, whether a malfunction on the rich side has continued for, for instance, 20 seconds or not is discriminated. When the malfunction has continued for 20 seconds, the processing routine advances to step 512, it is finally diagnosed as a malfunction on the rich side of the fuel supply system, the rich side diagnosis flag DGFUELRNG is set to "1" indicative of a malfunction on the rich side. In the following step 513, the warning lamp 37 is turned on to make the driver alert to the malfunction, and the program is finished.

When the count value of the rich side diagnosis counter cDFAFR is smaller than 20 in step 510, that is, when the malfunction on the rich side has not continued for 20 seconds, the program is finished without presenting the final diagnosis result.

When DGDELAFSM>tDFAFR (normal on the rich side) is discriminated in step 504, the processing routine advances to step 505 and the diagnostic parameter smoothed value DGDELAFSM is compared with the lean side diagnosis reference value tDFAFL. When DELAFSM≧tDFAFL (malfunction on the lean side), the processing routine advances to step 506 and the lean side diagnosis counter cDFAFL is increased by "1". In the following step 507, whether or not the count value of the lean side diagnosis counter cDFAFL is, for example, equal to or larger than 20, that is, whether the malfunction on the lean side has continued for, for example, 20 seconds or not is discriminated. If it has continued for 20 seconds, the processing routine advances to step 508, it is diagnosed finally that there is a malfunction on the lean side of the fuel supply system, and the lean side diagnosis flag DGFUELLNG is set to "1" indicative of a malfunction on the lean side. In the following step 513, the warning lamp 37 is turned on to make the driver alert to the malfunction and the program is finished.

When the count value of the lean side diagnosis counter cDFAFL is smaller than 20 in step 507, that is, when the malfunction on the lean side has not continued for 20 seconds, the program is finished without presenting a final diagnosis result.

Figure 14:
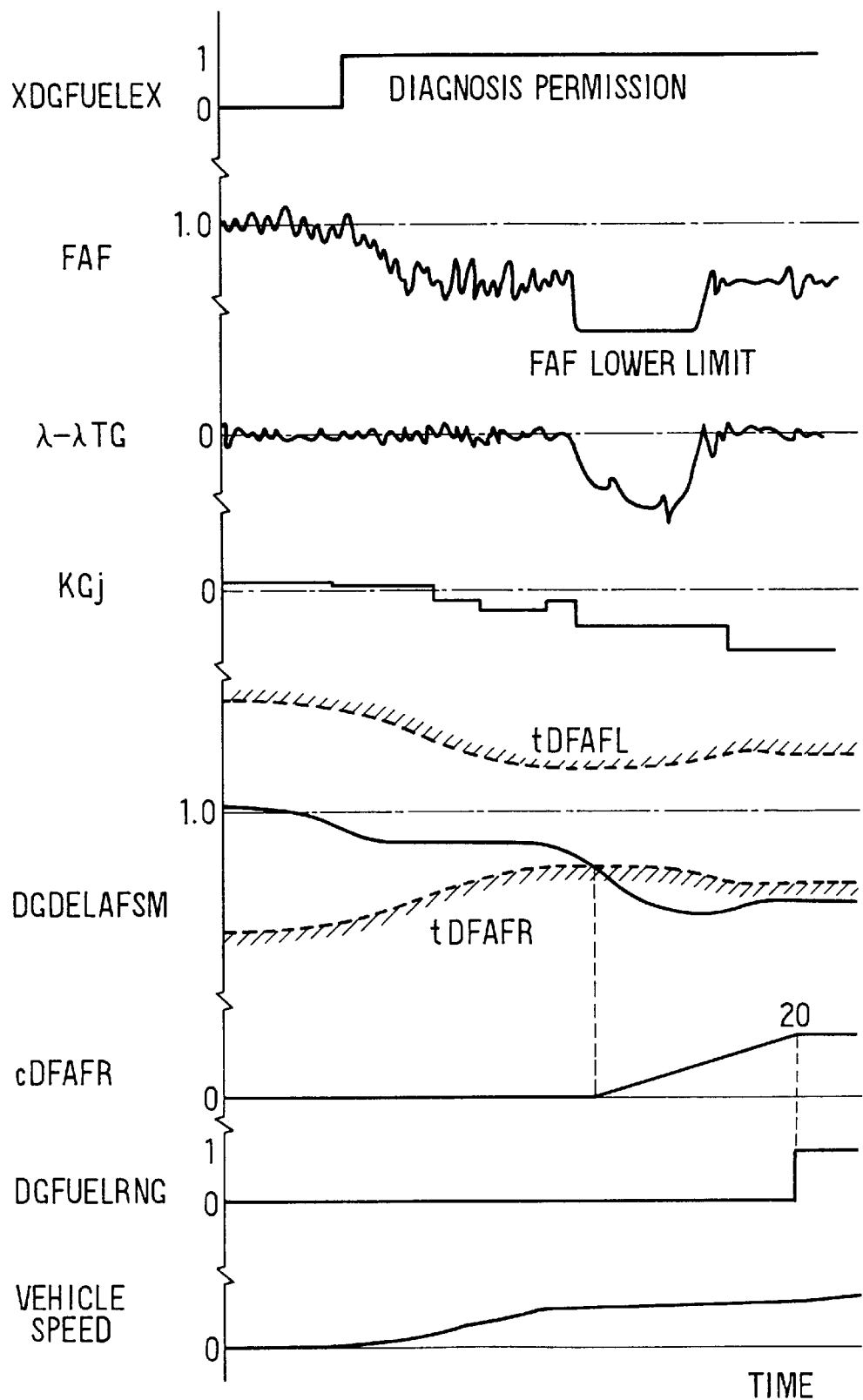
FIG. 14 is a timing chart showing operation of diagnosis for the fuel supply system.

As shown in FIG. 14, the air-fuel ratio correction coefficient FAF is stuck to the lower limit guard value from the halfway and the learned correction amount KGj is not updated. When the diagnosis parameter smoothed value DGDELAFSM is equal to or lower than the rich side diagnosis reference value tDFAFR even during the period for which the learned correction amount KGj is not updated, the rich side diagnosis counter cDFAFR is increased. The increment operation is repeated about every second as long as the state of DGDELAFSM≦tDFAFR continues. At the time point when the count value of the counter cDFAFR reaches 20 (seconds), the rich side diagnosis flag DGFUELRNG is set to "1" and the malfunction of the fuel supply system is detected.

According to the embodiment as mentioned above, (1) the difference between the actual air-fuel ratio λ detected by the air-fuel ratio sensor 28 and the target air-fuel ratio λTG, (2) the air-fuel ratio correction coefficient FAF (feedback correction amount), and (3) the learned correction amount KGj are used as data for diagnosing the fuel supply system. The three diagnostic data (1) to (3) are added up, thereby obtaining the diagnostic parameter DGDELAF, and the fuel supply system is diagnosed on the basis of the diagnostic parameter DGDELAF. Consequently, even when (3) the learned correction amount KGj is not updated, a malfunction (that is, an abnormal deviation of the actual air-fuel ratio λ) of the fuel supply system can be promptly detected from (1) the difference between the actual air-fuel ratio λ and the target air-fuel ratio λTG and (2) the air-fuel ratio correction coefficient FAF and the reliability of the diagnosis can be improved.

Since the fuel supply system is diagnosed on the basis of the diagnostic parameter DGDELAF obtained by adding up the three diagnostic data (1) to (3), as compared with a case of evaluating the three diagnostic data (1) to (3) separately, the logic of the diagnosis is very simple. Thus, the software configuration can be simplified, calculation can be reduced, and the speed of the arithmetic operation can be increased.

In the above embodiment, it is also possible to separately estimate the three diagnostic data (1) to (3) and to totally evaluate the three respective estimations, thereby diagnosing the fuel supply system. Even in this case, the object of the invention can be sufficiently achieved.

Since the diagnosis reference values tDFAFR and tDFAFL are set by the diagnosis reference value map of FIG. 13 in accordance with the intake air flow amount Ga, the optimum diagnosis reference values tDFAFR and tDFAFL according to the engine operating state can be set and the diagnosis accuracy can be improved.

In this case, the parameters of the diagnosis reference value map are not limited only by the intake air flow amount Ga. For example, various engine operating state parameters such as the intake vacuum pressure PM, the engine rotational speed Ne, and the like can be also used. It is not limited to the one-dimensional map but a two-dimensional map or a three-dimensional map can be also used.

The above embodiment may be modified further without departing from the spirit and scope of the present invention.

What is claimed is:

1. A system for diagnosing a fuel supply system of an internal combustion engine, said system comprising:

air-fuel ratio detecting means for detecting an actual air-fuel ratio of an exhaust gas;

basic fuel injection amount setting means for setting a basic fuel injection amount on the basis of an engine operating state;

air-fuel ratio feedback means for setting a feedback correction amount used for correcting a deviation of the actual air-fuel ratio from a target air-fuel ratio;

learning means for learning a correction amount used for correcting the deviation of the actual air-fuel ratio from the target air-fuel ratio and updating and storing the learned correction amount;

required fuel injection amount setting means for setting a required fuel injection amount on the basis of the basic fuel injection amount, the learned correction amount, and the feedback correction amount;

a fuel injection system for injecting fuel on the basis of the required fuel injection amount;

diagnosing means for diagnosing a fuel supply system including the fuel injection system on a basis using all three parameters of (a) a difference between the actual air-fuel ratio and the target air-fuel ration, (b) the feedback correction amount, and (c) the learned correction amount.

2. A system as in claim 1 further comprising:

diagnosis inhibiting means for inhibiting the diagnosis means from its diagnosis operation when the air-fuel ratio feedback means is disabled to set the feedback correction amount.

3. A system for diagnosing a fuel supply system of an internal combustion engine, said system comprising:

air-fuel ratio detecting means for detecting an actual air-fuel ratio of an exhaust gas;

basic fuel injection amount setting means for setting a basic fuel injection amount on the basis of an engine operating state;

air-fuel ratio feedback means for setting a feedback correction amount used for correcting a deviation of the actual air-fuel ratio from a target air-fuel ratio;

learning means for learning a correction amount used for correcting the deviation of the actual air-fuel ratio from the target air-fuel ratio and updating and storing the learned correction amount;

required fuel injection amount setting means for setting a required fuel injection amount on the basis of the basic fuel injection amount, the learned correction amount, and the feedback correction amount;

a fuel injection system for injecting fuel on the basis of the required fuel injection amount; and diagnosing means for diagnosing a fuel supply system including the fuel injection system on the basis of a difference between the actual air-fuel ratio and the target air-fuel ratio, the feedback correction amount and the learned correction amount;

wherein the diagnosing means calculates a sum of the difference between the actual air-fuel ratio and the target air fuel ratio, the feedback correction amount and the learned correction amount, and diagnoses the fuel supply system on the basis of the sum.

4. A system as in claim 3, wherein:

the diagnosing means smoothes the sum and diagnoses the fuel supply system on the basis of the smoothed value.

5. A system for diagnosing a fuel supply system of an internal combustion engine, said system comprising:

air-fuel ratio detecting means for detecting an actual air-fuel ratio of an exhaust gas;

basic fuel injection amount setting means for setting a basic fuel injection amount on the basis of an engine operating state;

air-fuel ratio feedback means for setting a feedback correction amount used for correcting a deviation of the actual air-fuel ratio from a target air-fuel ratio;

learning means for learning a correction amount used for correcting the deviation of the actual air-fuel ratio from the target air-fuel ratio and updating and storing the learned correction amount;

required fuel injection amount setting means for setting a required fuel injection amount on the basis of the basic fuel injection amount, the learned correction amount, and the feedback correction amount;

a fuel injection system for injecting fuel on the basis of the required fuel injection amount; and diagnosing means for diagnosing a fuel supply system including the fuel injection system on the basis of a difference between the actual air-fuel ratio and the target air-fuel ratio, the feedback correction amount and the learned correction amount;

wherein the diagnosis means sets a diagnosis reference value variably on the basis of an engine operating state for diagnosing the fuel supply system.

6. A system for diagnosing a fuel supply system of an internal combustion engine, said system comprising:

air-fuel ratio detecting means for detecting an actual air-fuel ratio of an exhaust gas;

basic fuel injection amount setting means for setting a basic fuel injection amount on the basis of an engine operating state;

air-fuel ratio feedback means for setting a feedback correction amount used for correcting a deviation of the actual air-fuel ratio from a target air-fuel ratio;

learning means for learning a correction amount used for correcting the deviation of the actual air-fuel ratio from the target air-fuel ratio and updating and storing the learned correction amount;

required fuel injection amount setting means for setting a required fuel injection amount on the basis of the basic fuel injection amount, the learned correction amount, and the feedback correction amount;

a fuel injection system for injecting fuel on the basis of the required fuel injection amount; and diagnosing means for diagnosing a fuel supply system including the fuel injection system on the basis of a difference between the actual air-fuel ratio and the target air-fuel ratio, the feedback correction amount and the learned correction amount;

a fuel evaporation gas purge system for adsorbing a fuel evaporation gas from a fuel tank and introducing the fuel evaporation gas into an intake system of the internal combustion engine; and diagnosis inhibiting means for inhibiting the diagnosis of the fuel supply system when the concentration of the fuel evaporation gas introduced from the fuel evaporation gas purge system into the intake system is higher than a predetermined value.

7. A method for diagnosing a fuel supply system of an internal combustion engine, said method comprising:

detecting an actual air-fuel ratio of an exhaust gas;

setting a basic fuel injection amount on the basis of an engine operating state;

setting a feedback correction amount used for correcting a deviation of the actual air-fuel ratio from a target air-fuel ratio;

learning a correction amount used for correcting the deviation of the actual air-fuel ratio from the target air-fuel ratio and updating and storing the learned correction amount;

setting a required fuel injection amount on the basis of the basic fuel injection amount, the learned correction amount, and the feedback correction amount;

injecting fuel on the basis of the required fuel injection amount;

diagnosing a fuel supply system including the fuel injection system on a basis using all three parameters of (a) a difference between the actual air-fuel ratio and the target air-fuel ratio, (b) the feedback correction amount, and (c) the learned correction amount.

8. A method as in claim 7 further comprising:

inhibiting the diagnosis step from its diagnosis operation when the air-fuel ratio feedback is disabled to set the feedback correction amount.

9. A method for diagnosing a fuel supply system of an internal combustion engine, said method comprising:

detecting an actual air-fuel ratio of an exhaust gas;

setting a basic fuel injection amount on the basis of an engine operating sate;

setting a feedback correction amount used for correcting a deviation of the actual air-fuel ratio from a target air-fuel ratio;

learning a correction amount used for correcting the deviation of the actual air-fuel ratio from the target air-fuel ratio and updating and storing the learned correction amount;

setting a required fuel injection amount on the basis of the basic fuel injection amount, the learned correction amount, and the feedback correction amount;

injecting fuel on the basis of the required fuel injection amount; and diagnosing a fuel supply system including the fuel injection system on the basis of a difference between the actual air-fuel ratio and the target air-fuel ratio, the feedback correction amount and the learned correction amount;

wherein the diagnosing step includes calculating a sum of the difference between the actual air-fuel ratio and the target air fuel ratio, the feedback correction amount and the learned correction amount, and diagnosing the fuel supply system on the basis of the sum.

10. A method as in claim 9, wherein:

the diagnosing step smoothes the sum and diagnoses the fuel supply system on the basis of the smoothed value.

11. A method for diagnosing a fuel supply system of an internal combustion engine, said method comprising:

detecting an actual air-fuel ratio of an exhaust gas;

setting a basic fuel injection amount on the basis of an engine operating state;

setting a feedback correction amount used for correcting a deviation of the actual air-fuel ratio from a target air-fuel ratio;

learning a correction amount used for correcting the deviation of the actual air-fuel ratio from the target air-fuel ratio and updating and storing the learned correction amount;

setting a required fuel injection amount on the basis of the basic fuel injection amount, the learned correction amount, and the feedback correction amount;

injecting fuel on the basis of the required fuel injection amount; and diagnosing a fuel supply system including the fuel injection system on the basis of a difference between the actual air-fuel ratio and the target air-fuel ratio, the feedback correction amount and the learned correction amount;

wherein the diagnosis step sets a diagnosis reference value variably on the basis of an engine operating state for diagnosing the fuel supply system.

12. A method for diagnosing a fuel supply system of an internal combustion engine, said method comprising:

detecting an actual air-fuel ratio of an exhaust gas;

setting a basic fuel injection amount on the basis of an engine operating sate;

setting a feedback correction amount used for correcting a deviation of the actual air-fuel ratio from a target air-fuel ratio;

learning a correction amount used for correcting the deviation of the actual air-fuel ratio from the target air-fuel ratio and updating and storing the learned correction amount;

setting a required fuel injection amount on the basis of the basic fuel injection amount, the learned correction amount, and the feedback correction amount;

injecting fuel on the basis of the required fuel injection amount; and diagnosing a fuel supply system including the fuel injection system on the basis of a difference between the actual air-fuel ratio and the target air-fuel ratio, the feedback correction amount and the learned correction amount;

absorbing a fuel evaporation gas from a fuel tank and introducing the fuel evaporation gas into an intake system of the internal combustion engine; and inhibiting the diagnosis of the fuel supply system when the concentration of the fuel evaporation gas introduced from the fuel evaporation gas purge system into the intake system is higher than a predetermined value.

13. A method for diagnosing abnormalities in an internal combustion engine fuel supply system, said method comprising:

generating a first signal representing the difference between an actual air-fuel ratio and a target air-fuel ratio for the engine;

generating a second signal representing a feedback correction value for the target air-fuel ratio;

generating a third signal representing a learned correction value for the target air-fuel ratio; and using each of said first, second and third signals to diagnose the existence of an abnormality in the fuel supply system.

14. A method as in claim 13 wherein said using step includes diagnosing the fuel supply system based on the sum of said first, second and third signals.

15. A method as in claim 14 wherein said using step smoothes said sum and diagnoses the fuel supply system based on the thus smoothed sum value.

16. A method as in claim 13 wherein said using step uses a reference value to diagnose the fuel supply system which reference value changes as a function of an engine operating state.

17. A method as in claim 13 wherein:

said diagnosis step is inhibited when previously adsorbed evaporated fuel is being returned to an engine intake in a concentration higher than a predetermined value.

18. A method as in claim 13 wherein:

said using step is temporarily inhibited in response to temporary inhibition of the generation of said second signal due to engine operating conditions.

19. Apparatus for diagnosing abnormalities in an internal combustion engine fuel supply system, said apparatus comprising:

means for generating a first signal representing the difference between an actual air-fuel ratio and a target air-fuel ratio for the engine;

means for generating a second signal representing a feedback correction value for the target air-fuel ratio, means for generating a third signal representing a learned correction value for the target air-fuel ratio; and means for using each of said first, second and third signals to diagnose the existence of an abnormality in the fuel supply system.

20. Apparatus as in claim 19 wherein said means for using includes means for diagnosing the fuel supply system based on the sum of said first, second and third signals.

21. Apparatus as in claim 20 wherein said means for using includes means for smoothing said sum and for diagnosing the fuel supply system based on the thus smoothed sum value.

22. Apparatus as in claim 19 wherein said means for using uses a reference value to diagnose the fuel supply system which reference value changes as a function of an engine operating state.

23. Apparatus as in claim 19 wherein:
said means for using includes means for inhibiting said diagnosis when previously adsorbed evaporate fuel is being returned to an engine intake in a concentration higher than a predetermined value.

24. Apparatus as in claim 19 wherein:
said means for using is temporarily inhibited in response to temporary inhibition of the means for generating said second signal due to engine operating conditions.

* * * * *